(12) United States Patent
Verhagen et al.

(10) Patent No.: US 9,139,180 B2
(45) Date of Patent: Sep. 22, 2015

(54) HYDRAULIC MAIN BRAKE CYLINDER

(75) Inventors: Armin Verhagen, Schwieberdingen (DE); Jochen Mayer, Giengen (DE); Willi Nagel, Remseck/Hochdorf (DE)

(73) Assignee: Robert Bosch GmbH, Stuttgart (DE)

( * ) Notice: Subject to any disclaimer, the term of this patent is extended or adjusted under 35 U.S.C. 154(b) by 868 days.

(21) Appl. No.: 13/387,024

(22) PCT Filed: May 27, 2010

(86) PCT No.: PCT/EP2010/057290
§ 371 (c)(1),
(2), (4) Date: Apr. 5, 2012

(87) PCT Pub. No.: WO2011/012345
PCT Pub. Date: Feb. 3, 2011

(65) Prior Publication Data
US 2012/0192556 A1    Aug. 2, 2012

(30) Foreign Application Priority Data
Jul. 27, 2009 (DE) .......................... 10 2009 028 034

(51) Int. Cl.
| B60T 11/16 | (2006.01) |
|---|---|
| B60T 8/40 | (2006.01) |
| B60T 8/38 | (2006.01) |
| B60T 11/18 | (2006.01) |
| B60T 11/20 | (2006.01) |
| B60T 13/74 | (2006.01) |

(52) U.S. Cl.
CPC ............... B60T 8/4072 (2013.01); B60T 8/38 (2013.01); B60T 11/18 (2013.01); B60T 11/20 (2013.01); B60T 13/745 (2013.01)

(58) Field of Classification Search
CPC ......... B60T 8/38; B60T 8/4072; B60T 11/18; B60T 11/20; B60T 13/745
USPC ............... 60/561, 562, 538, 567, 588, 545
See application file for complete search history.

(56) References Cited

U.S. PATENT DOCUMENTS

| 7,367,187 B2* | 5/2008 | Ikeda et al. ..................... 60/545 |
| 2008/0056881 A1* | 3/2008 | Mollhagen ..................... 415/13 |

FOREIGN PATENT DOCUMENTS

| DE | 103 27 553 A1 | 1/2005 |
|---|---|---|
| EP | 1 964 739 A2 | 9/2008 |
| EP | 2 019 010 A2 | 1/2009 |
| FR | 2 826 622 A1 | 1/2003 |
| JP | 2008 162482 A | 7/2008 |
| JP | 2009 056936 A | 3/2009 |
| WO | 2008/104455 A1 | 9/2008 |

OTHER PUBLICATIONS

International Search Report corresponding to PCT Application No. PCT/EP2010/057290, mailed Jul. 23, 2010 (German and English language document) (6 pages).

* cited by examiner

*Primary Examiner* — Dwayne J White
*Assistant Examiner* — Logan Kraft
(74) *Attorney, Agent, or Firm* — Maginot, Moore & Beck LLP

(57) ABSTRACT

A hydraulic main brake cylinder, preferably having an electro-mechanical brake booster for a brake assembly of a vehicle is disclosed. The main brake cylinder is provided with two pressure rod pistons, preferably nesting within each other, one of which is actuated by muscle power, and the other one is actuated by the brake booster. Furthermore, an energy store is provided, which stores energy when the main brake cylinder is released and then transferred to the main brake cylinder upon the actuation thereof, thus supporting the operation of the main brake cylinder.

15 Claims, 2 Drawing Sheets

HYDRAULIC MAIN BRAKE CYLINDER

This application is a 35 U.S.C. §371 National Stage Application of PCT/EP2010/057290, filed on May 27, 2010, which claims the benefit of priority to Serial No. DE 10 2009 028 034.0, filed on Jul. 27, 2009 in Germany, the disclosures of which are incorporated herein by reference in their entirety.

The disclosure relates to a hydraulic master brake cylinder for a vehicle brake system.

BACKGROUND

Master brake cylinders having a vacuum-type brake force booster are known and are common for vehicle brake systems in passenger motor vehicles.

The laid-open specification DE 103 27 553 A1 discloses an electromechanical brake force booster having an electric motor which acts via a rotation/translation conversion mechanism on a thrust rod piston of a hydraulic master brake cylinder. The electric motor of the known brake force booster is a hollow-shaft motor, the hollow shaft of which is formed as a nut of a spindle gearing. The spindle gearing forms a rotation/translation conversion mechanism which converts the rotational drive movement of the electric motor into a translatory drive output movement for displacing the thrust rod piston. An electromechanical brake force booster may be of some other design. A thrust rod piston refers here to the or a piston of the master brake cylinder which, for the actuation of the master brake cylinder, is displaced in the master brake cylinder by the brake force booster and/or by the muscle force of a vehicle driver. The thrust rod piston may also be referred to as primary piston or simply as piston or master brake cylinder piston. The displacement of the thrust rod piston by muscle force, that is to say an actuation of the master brake cylinder under muscle force, is conventionally carried out with a foot by means of a (foot-operated) brake pedal or by hand by means of a (hand-operated) brake lever.

SUMMARY

The master brake cylinder according to the disclosure has two thrust rod pistons which are displaceable relative to one another. One of the two thrust rod pistons is displaced by a vehicle driver by muscle force, and the other thrust rod piston is displaced by the brake force booster. In contrast to the prior art, coupling of the booster force from the brake force booster and of the muscle force of a vehicle driver takes place not mechanically outside the master brake cylinder but rather hydraulically in the master brake cylinder. An independent displacement of the two thrust rod pistons, and as a result an independent movement of the brake force booster and of the muscle force movement of the vehicle driver, is possible, wherein the independence of the two movements may be restricted in developments and refinements of the disclosure. The ratio of the piston surface areas of the two thrust rod pistons determines the boost factor of the brake force booster.

During a normal service braking operation, the brake force booster displaces the other thrust rod piston synchronously with respect to a thrust rod piston which is displaced by the vehicle driver by muscle force. During the synchronous displacement of the two thrust rod pistons, it is the case, as stated, that the ratio of the piston surfaces of the two thrust rod pistons determines the boost factor of the brake force booster.

A so-called springer function, that is to say a slightly increased brake force boost at the start of the brake actuation and at the start of the displacement of the thrust rod piston, is achieved by means of an initially greater displacement travel of the thrust rod piston which is displaced by the brake force booster.

The master brake cylinder may be actuated both exclusively by the brake force booster and also exclusively by muscle force, rather than both by the brake force booster and by muscle force as is the case during the normal service braking operation. The actuation both by means of the brake force booster and also by muscle force is a power-assisted braking operation, the actuation exclusively by the brake force boosting is an externally-powered braking operation, and the actuation exclusively by muscle force is a muscle-force-powered braking operation. The master brake cylinder according to the disclosure permits an exclusively muscle-force-powered braking operation for example in the event of failure of the brake force booster, wherein the brake force booster is not jointly moved and the actuation by muscle force is not made more difficult or hindered.

The master brake cylinder according to the disclosure is particularly suitable for hybrid vehicles with drive provided by an internal combustion engine and by an electric motor, and also for purely electric vehicles. In such vehicles, for braking the vehicle, the electric drive motor can be operated as a generator, such that a greater or lesser part of the brake force or brake power is imparted by the electric drive motor and the remaining part is imparted by the vehicle brake system. The fraction of the braking power provided by the electric drive motor during generator operation may lie between 100% and 0%; it varies as a function inter alia of the respective driving situation and for example also as a function of a state of charge of a battery which provides electrical current for driving the vehicle by means of the electric drive motor and which is charged with electrical current by the electric drive motor in the generator mode during braking. The recovery of kinetic energy of the vehicle is referred to as recuperation.

It is desirable for the fact that a part of the braking force is generated not by the vehicle brake system but rather by the electric drive motor during generator operation to be as imperceptible as possible to a vehicle driver. The braking partially by means of the electric drive motor in the generator mode and otherwise by means of the vehicle brake system is referred to as "blending". Blending which is as imperceptible as possible to the vehicle driver is difficult inter alia because the braking power of the electric drive motor may vary constantly. As a result of the possibility for independent displacement of the two thrust rod pistons by muscle force and by the brake force booster, the master brake cylinder according to the disclosure makes it possible to more easily realize blending which is as imperceptible as possible. As a result of the hydraulic coupling of the brake force booster and the muscle force actuation, imperceptible blending is more easily possible with the master brake cylinder according to the disclosure than with mechanical coupling.

For imperceptible blending, the boost factor of the brake force booster must be reduced, in accordance with the braking power of the electric drive motor in the generator mode, to such an extent that, for the same muscle force exerted on the thrust rod piston of the master brake cylinder, and preferably for the same muscle force travel, an overall braking power of the electric drive motor in the generator mode and of the vehicle brake system is obtained which is identical to that obtained in the case of a braking operation exclusively by means of the vehicle brake system.

Advantageous developments and refinements are set forth below in the disclosure.

One development of the disclosure provides a resilient connection between the two thrust rod pistons in the displacement direction. The resilient connection may act in one or both directions. The resilient connection provides mechanical coupling in addition to the hydraulic coupling. The resilient connection has the advantage that, in the event of a displacement of one of the two thrust piston rods, the other is likewise displaced, albeit to a lesser extent.

One development of the disclosure provides a limitation of the displacement of the two thrust rod pistons relative to one another in order to avoid an unlimited displacement of the two thrust rod pistons relative to one another.

One development of the disclosure provides a controllable brake force booster. "Controllable" means that a booster force of the brake force booster can be controlled independently of the muscle force exerted on the master brake cylinder, wherein within the context of the disclosure "control" should also be understood to mean "regulation". An electromechanical brake force booster is, owing to its design, controllable, for which reason such an electromechanical brake force booster is preferably provided. A vacuum-type brake force booster may be designed to be controllable, for example by virtue of its working chambers being designed such that they can be aerated by means of a valve. As a valve, there is provided for example a solenoid valve, or for better controllability, a proportional valve. The disclosure is not restricted to the brake force boosters listed.

In a preferred development of the disclosure, an energy store is provided which stores energy upon the release of the master brake cylinder and which, upon an actuation of the master brake cylinder, transmits stored energy to the master brake cylinder and thereby assists the actuation of the master brake cylinder. The storing of energy in the energy store takes place, for example in the event of an active release of the master brake cylinder, by means of the brake force booster, which may be possible with an electromechanical brake force booster or generally a brake force booster which can impart a booster force counter to the actuating direction. Although energy must be imparted by the brake force booster both upon actuation and also upon release, it is however the case that, during a brake actuation, the booster force and the energy imparted thereby are lower than they would be without the assistance by the energy store. It is therefore possible to use a brake force booster of lower power. A further advantage of this development of the disclosure is that energy which is released upon the release of a vehicle brake system is stored in the energy store.

BRIEF DESCRIPTION OF THE DRAWING

The disclosure will be explained in more detail below on the basis of an exemplary embodiment illustrated in the drawing, in which.

The figures are simplified schematic illustrations for explaining and for understanding the disclosure.

DETAILED DESCRIPTION

Figure 1:
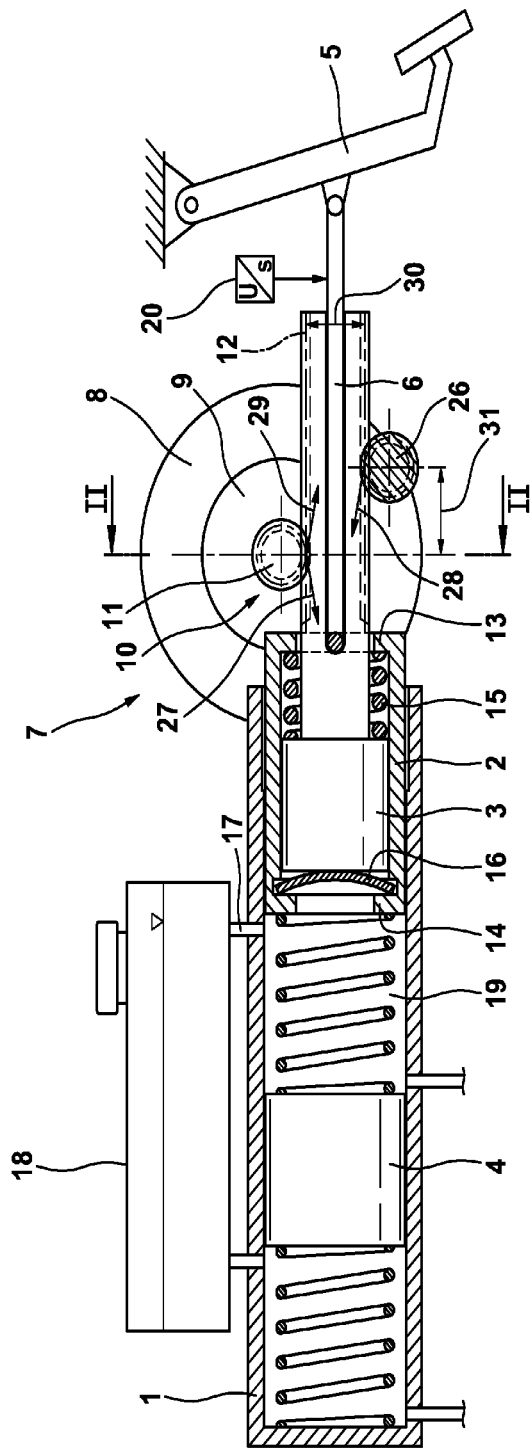
FIG. 1 shows a master brake cylinder according to the disclosure in axial section.

The master brake cylinder 1 according to the disclosure illustrated in FIG. 1 is a tandem master brake cylinder with two thrust rod pistons 2, 3 and a floating piston 4. A thrust rod piston 2, 3 can also be referred to as primary piston or input piston, and the floating piston 4 can also be referred to as secondary piston. One of the two thrust rod pistons 2 is a tubular hollow piston in which the other thrust rod piston 3 is held in an axially displaceable manner. The two thrust rod pistons 2, 3 are sealed off with respect to one another and the tubular first thrust rod piston 2 is sealed off in the master brake cylinder 1. The tubular first thrust rod piston 2 is actuated mechanically by muscle force by means of a (foot-operated brake) pedal 5 via a piston rod 6, which is articulatedly connected to the pedal 5 and to the first thrust rod piston 2. A muscle force actuation may also be realized for example by hand via a hand-operated brake lever (not illustrated).

The other, inner thrust rod piston 3 is actuated, that is to say displaced in the master brake cylinder 1 or in or with the first tubular thrust rod piston 2, by a brake force booster 7. In the exemplary embodiment, the brake force booster 7 is an electromechanical brake force booster 7, which is however not imperative for the disclosure. The brake force booster 7 has an electric motor 8 on which is flange-mounted a reduction gearing 9, for example a planetary gear set, which via a rack and pinion gearing 10 displaces the other, inner thrust rod piston 3. The rack and pinion gearing 10 has a pinion 11 on an output shaft of the reduction gearing 9, which pinion meshes with a toothed rack 12 rigidly connected to the other, inner thrust rod piston 3.

The tubular first thrust piston rod 2 has inwardly projecting flanges 13 at both ends. At a rear end of the tubular first thrust piston rod 2, the toothed rack 12 extends through the flange 13. The rear end is that end side of the thrust rod piston 2 which faces toward the pedal 5. The master brake cylinder 1 has not one but two piston rods 6 which are arranged congruently adjacent to one another in longitudinal grooves of the toothed rack 12 (cf. FIG. 2). The piston rods 6 are articulatedly mounted on the flange 13 at the rear end of the tubular first thrust rod piston 2.

The inwardly projecting flanges 13, 14 of the tubular first thrust rod piston 2 form stops which limit a displacement travel of the two thrust rod pistons 2, 3 relative to one another. The flanges 13, 14 may also be regarded as a relative displacement travel limitation or relative displacement travel limitation means for the displacement travel of the two thrust rod pistons 2, 3 relative to one another. Arranged at both ends of the other, inner thrust rod piston 3 are spring elements 15, 16 which are supported on the flanges 13, 14 of the tubular first thrust rod piston 2. The spring elements 15, 16 connect the two thrust rod pistons 2, 3 in a resilient manner in the displacement direction, that is to say in the axial direction. In the exemplary embodiment, the spring element 15 at the rear end, which faces toward the pedal 5, of the other, inner thrust rod piston 3 is a helical compression spring.

The spring element 16 at the front end of the other, inner thrust rod piston 3 is, in the exemplary embodiment, a spring washer which is curved in the shape of a dome and the spring travel of which is a fraction, and the spring constant of which is a multiple, of the spring travel and the spring constant, respectively, of the spring element 15 at the rear end of the other, inner thrust rod piston 3. Spring elements other than a helical compression spring and a spring washer are also possible; likewise, the arrangement of the short spring travel and the large spring constant on the front side of the other, inner thrust rod piston 3 is not imperative for the disclosure, but is preferable.

It is not imperative for the tubular first thrust rod piston 2 to be actuated by muscle force and the other, inner thrust rod piston 3 to be actuated by the brake force booster 7. It is however considered to be advantageous for the tubular, outer first thrust rod piston 2 to be actuated by muscle force because, after a short displacement travel, it closes off a breather bore 17 via which a brake fluid reservoir 18 communicates with a pressure chamber 19 of the master brake cylinder 1. Instead of two thrust rod pistons 2, 3 situated one inside the other, it is also conceivably possible to provide two thrust rod pistons which are arranged parallel or at an angle or in a skewed alignment with respect to one another, which thrust rod pistons are arranged in a correspondingly modified master brake cylinder 1, or at least one of which even has its own cylinder (not illustrated). The two thrust rod pistons communicate hydraulically.

A normal service braking operation is realized by means of muscle force actuation, that is to say the brake pedal 5 is depressed and, via the piston rod 6, displaces the tubular first thrust rod piston 2. An electronic controller (not illustrated) controls the brake force booster 7 such that the other, inner thrust rod piston 3 is displaced synchronously with the tubular first thrust rod piston 2, wherein "control" should also be understood to mean "regulation". For the control of the brake force booster 7, the master brake cylinder 1 has a travel sensor 20 and/or a force sensor (not illustrated) by means of which a pedal travel and/or a pedal force of the pedal 5 are measured. The displacement or position of the other, inner thrust rod piston 3 which is displaced by the brake force booster can be measured for example on the basis of an electronic commutation of the electric motor 8 of the brake force booster 7.

The floating piston 4 is actuated, that is to say displaced in the master brake cylinder 1, by hydraulic pressurization by the thrust rod pistons 2, 3, in a manner known per se.

A so-called springer function, that is to say a slightly increased brake force boost at the start of a brake actuation, can be achieved by virtue of the other, inner thrust rod piston 3 which is displaced by the brake force booster 7 being displaced further at the start of the displacement than the tubular first thrust rod piston 2 which is displaced by muscle force by means of the pedal 5.

Force boosting, that is to say the boosting of the muscle force by the brake force booster 7, that is to say a boost factor of the brake force booster 7, is determined, during synchronous displacement of the two thrust rod pistons 2, 3, by the ratio of the piston surface areas thereof. The piston surface area of the tubular first thrust rod piston 2 is a circular ring-shaped surface. For greater force boosting, the other, inner thrust rod piston 3 which is displaced by the brake force booster 7 is displaced further than the tubular first thrust rod piston 2 which is actuated by muscle force, and for lesser force boosting, the situation is reversed. The two thrust rod pistons 2, 3 are hydraulically coupled by means of brake fluid in the pressure chamber 19, which they act on, of the master brake cylinder 1, and are additionally mechanically and resiliently coupled by means of the spring elements 15, 16. In the case of an unequal displacement of the two thrust rod pistons 2, 3, the spring elements 15, 16 transmit a force from the thrust rod piston 2, 3 which has been displaced to a greater extent to the thrust rod piston 2, 3 which has been displaced to a lesser extent.

Autonomous braking without muscle force actuation may be realized by displacement of the other, inner thrust rod piston 3 by means of the brake force booster 7. By means of the spring element 16 on the front side of the other, inner thrust rod piston 3, the tubular first thrust rod piston 2 is driven along resiliently and in a damped manner.

In the event of failure of the electromechanical brake force booster 7, exclusively muscle-force-powered actuation by means of the brake pedal 5 is possible. As a result of its small, circular-ring-shaped piston surface, the tubular first thrust rod piston 2 which is actuated by muscle force has a large hydraulic transmission ratio, which is advantageous in the case of an exclusively muscle-force-powered actuation of the master brake cylinder 1 in the event of failure of the brake force booster 7. The spring element 15 at the rear end of the other, inner thrust rod piston 3 transmits a force from the tubular first thrust rod piston 2 to the other, inner thrust rod piston 3, such that in the case of a muscle-force-powered actuation of the master brake cylinder 1, the other, inner thrust rod piston 3 is also displaced in the master brake cylinder 1, but the displacement travel of the other, inner thrust rod piston 3 is in this case shorter than the displacement travel of the tubular first thrust rod piston 2. The hydraulic transmission ratio of the tubular first thrust rod piston 2 is decreased as a result of the other, inner thrust rod piston 3 being driven along. The spring element 15 at the rear end of the other, inner thrust rod piston 3 has been selected with a spring constant smaller than that of the spring element 16 at the front end of said other, inner thrust piston rod 3, such that the other, inner thrust piston rod 3 is driven along more smoothly in the event of an exclusively muscle-force-powered actuation of the master brake cylinder 1. If the spring element 15 at the rear end of the other, inner thrust rod piston 3 assumes a "blocked" state, the other, inner thrust rod piston 3 moves synchronously with the tubular first thrust rod piston 2.

Figure 2:
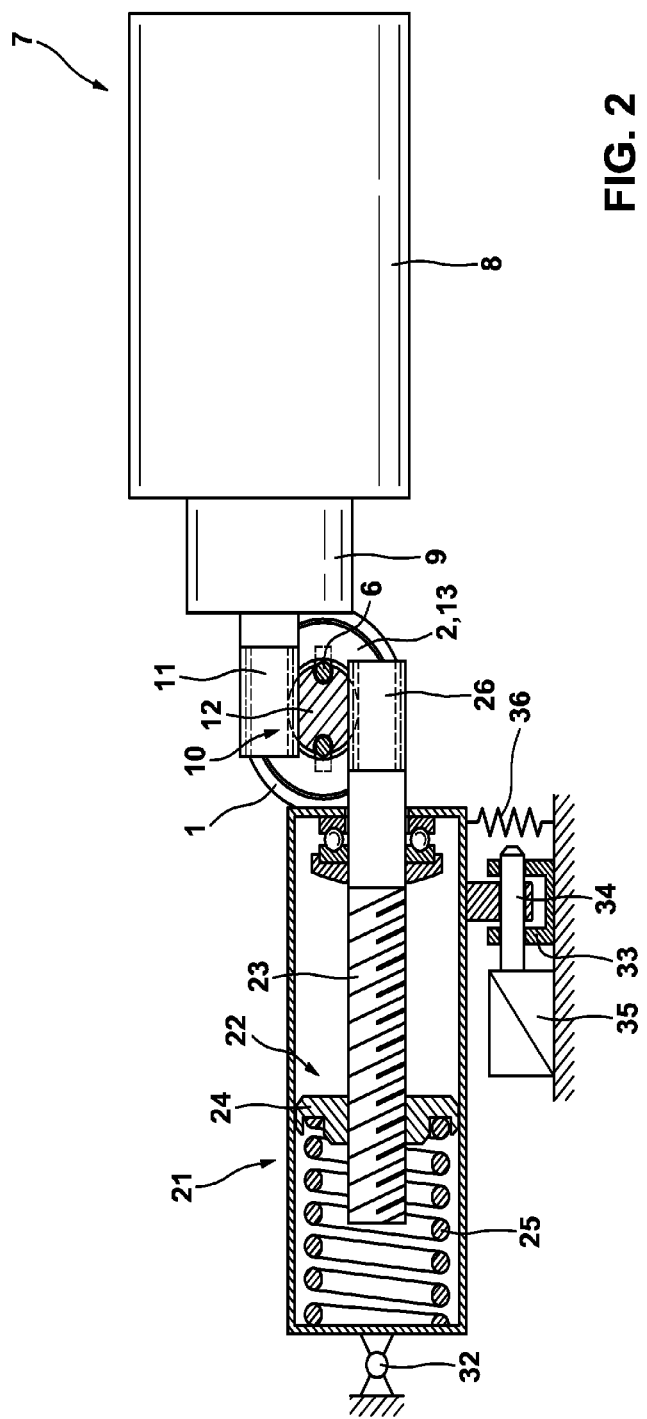
FIG. 2 shows a cross-sectional illustration along the line II-II in FIG. 1.

The master brake cylinder 1 according to the disclosure has an energy store 21 which is situated in front of the plane of the drawing in FIG. 1 and which is therefore visible only in FIG. 2. Upon the release of the master brake cylinder 1, that is to say in the event of a displacement of the thrust rod pistons 2, 3 out of the cylinder 1, the energy store 21 stores energy, which energy is output again by the energy store 21 upon an actuation of the master brake cylinder 1, that is to say in the event of a displacement of the thrust rod piston 2, 3 into the master brake cylinder 1, and thereby assists the actuation of the master brake cylinder 1. In the exemplary embodiment, the energy store 21 is a spring energy store, which is however not imperative for the disclosure. The energy store 21 has a spindle gearing 22 with a spindle 23 and a nut 24. The spindle gearing 22 is of non-self-locking design. A spring element 25 is supported in a housing of the energy store 21 and presses axially against the nut 24. A helical compression spring is illustrated, though other springs may also be used, in particular a plate spring pack (not illustrated). The spindle 23 has a pinion 26 which meshes with the toothed rack 12, which toothed rack is rigidly connected to the other, inner thrust rod piston 3 and forms the piston rod of said thrust rod piston 3. The pinion 26 of the energy store 21 engages on a side of the toothed rack 12 situated opposite the side engaged on by the pinion 11 of the brake force booster 7, and the toothed rack 12 therefore has two mutually opposite toothings. The two pinions 11, 26 support the toothed rack 12 at alternate sides against transverse forces or transverse force components which act when the toothed rack 12 is driven by means of the pinions 11, 26. A separate support of the toothed rack 12 against transverse loading is thereby dispensed with, and the other, inner thrust rod piston 3 is not acted on with a torque about a transverse axis.

Upon the release of the master brake cylinder 1, the other, inner thrust rod piston 3 is displaced out of the cylinder 1 and displaces the toothed rack 12, which forms the piston rod of said other, inner thrust rod piston 3, in the direction of the pedal 5. In so doing, the toothed rack 12 sets the pinion 26, and with it the spindle 23 of the energy store 21, in rotation. The nut 24 is displaced axially and stresses the spring element 25, such that energy is stored in the energy store 21.

To be able to stress the spring element 25 of the energy store 21, the toothed rack 12 must be driven by the brake force booster 7, that is to say the master brake cylinder 1 must be actively released by means of the brake force booster 7. For this purpose, the energy store 21 assists the actuation of the master brake cylinder 1: the spindle gearing 22 of the energy store 21 is of non-self-locking design and converts the axial force of the spring element 25 into a torque which loads the toothed rack 12 in the direction of the master brake cylinder 1 and thereby assists an actuation of the master brake cylinder 1. The force and the energy which must be imparted by the brake force booster 7 for the actuation of the master brake cylinder 1 is correspondingly reduced as a result of the action of the energy store 21. Because the actuating force is distributed between the brake force booster 7 and the energy store 21, a mechanical loading of the toothed rack gearing 10 of the brake force booster 7 is correspondingly reduced, and said toothed rack gearing can be dimensioned to be of correspondingly lower strength.

The forces exerted by the pinions 11, 26 of the brake force booster 7 and of the energy store 21 on the two opposite toothings of the toothed rack 12 act perpendicularly to the tooth flanks, which bear against one another, of the teeth, which mesh with the toothings of the toothed racks 12, of the pinions 11, 26. The forces thus act in the longitudinal direction of the toothed rack 12 and are directed slightly obliquely inward, as indicated by the force arrows 27, in FIG. 1. The forces 27, 28 therefore have an inwardly directed force component perpendicular to the toothed rack 12; said transverse force components are compensated if the forces acting on the toothings are of equal magnitude, specifically also if the pinions 11, 26 of the brake force booster 7 and of the energy store 21 are arranged with an axial offset.

Upon the release of the master brake cylinder 1, the force which is exerted by the pinion 11 of the brake force booster 7 on the toothed rack 12 is reversed; said force, as indicated by the force arrow 29 in FIG. 1, is directed away from the master brake cylinder 1 and, in an unchanged manner, obliquely inward, whereas the force exerted by the pinion 26 of the energy store 21 on the toothed rack 12 is directed, in an unchanged manner, in the direction of the master brake cylinder 1 and obliquely inward. As a result, there is exerted on the toothed rack 12 a torque which acts counterclockwise in FIG. 1. Said torque increases with increasing spacing 30 of the opposite toothings of the toothed rack 12 and decreases with increasing offset 31 of the pinions 11, 26 of the brake force booster 7 and of the energy store 21 in the axial direction. The pinion 26 of the energy store 21 is therefore a greater distance from the master brake cylinder 1 than the pinion 11 of the brake force booster 7, such that the two pinions 11, 26 have the offset 31.

The energy store 21 is mounted in a pivotable manner by means of a joint 32, enabling said energy store to pivot such that its pinion 26 passes out of engagement with the toothed rack 12. A support 33 supports the energy store 21 so as to prevent it from pivoting out of engagement, which support 33 has a bar 34 which can be released by means of an electromagnet 35. The release of the bar 34 causes the supporting action of the support 33 to be eliminated, as a result of which the energy store 21 pivots such that its pinion 26 passes out of engagement with the toothed rack 12. A spring element 36 ensures reliable pivoting out of engagement when the support 33 is released. The pivoting of the pinion 26 of the energy store 21 out of engagement with the toothed rack 12 is provided in the event of a blockage or some other defect of the energy store 21 or in the event of a failure of the brake force booster 7. The joint 32 and the releasable support 33 of the energy store 21 form a decoupling means with which the energy store can be decoupled from the actuation of the master brake cylinder 1, that is to say can, as described, be placed out of engagement with the toothed rack 12.

The invention claimed is:

1. A hydraulic master brake cylinder for a vehicle brake system, comprising:
    a brake force booster;
    a first thrust rod piston configured to be displaced in the master brake cylinder by muscle force to actuate the vehicle brake system; and
    a second thrust rod piston configured to be displaced in the master brake cylinder by the brake force booster to actuate the vehicle brake system,
    wherein the first thrust rod piston is configured such that displacement of the first thrust rod piston results in the first thrust rod piston blocking a breather bore fluidly connecting a brake fluid reservoir with a pressure chamber of the master brake cylinder, and
    wherein the second thrust rod piston is accommodated in the first thrust rod piston and the first thrust rod piston is configured such that the muscle force displaces the first thrust rod piston relative to the second thrust rod piston.

2. The master brake cylinder as claimed in claim 1, wherein the first thrust rod piston is located outside the second thrust rod piston.

3. The master brake cylinder as claimed in claim 1, wherein the second thrust rod piston is configured to be displaced relative to the first thrust rod piston by the brake force booster.

4. The master brake cylinder as claimed in claim 1, wherein the first and second thrust rod pistons are arranged parallel with respect to one another.

5. The master brake cylinder as claimed in claim 4, wherein at least one of the first and second thrust rod pistons defines a separate cylinder.

6. The master brake cylinder as claimed in claim 1, wherein the first and second thrust rod pistons are resiliently connected in a displacement direction by one or more spring elements.

7. The master brake cylinder as claimed in claim 1, wherein the first and second thrust rod pistons have a relative displacement travel limiting mechanism that is configured to limit a displacement travel of the first and second thrust rod pistons relative to one another.

8. The master brake cylinder as claimed in claim 1, wherein the brake force booster is a controllable brake force booster.

9. The master brake cylinder as claimed in claim 8, brake force booster is an electromechanical brake force booster.

10. The master brake cylinder as claimed in claim 1, further comprising:
    an energy store configured to store energy upon a release of the master brake cylinder and, upon an actuation of the master brake cylinder, transmit stored energy to the master brake cylinder to assist the actuation of the master brake cylinder.

11. The master brake cylinder as claimed in claim 10, wherein the energy store includes a spring energy store.

12. The master brake cylinder as claimed in claim 10, wherein the brake force booster engages on one side of a piston rod of the second thrust rod piston and the energy store engages on an opposite side of the piston rod of the second thrust rod piston.

13. The master brake cylinder as claimed in claim 10, wherein the energy store includes a decoupling mechanism configured to decouple the energy store from the actuation of the master brake cylinder.

14. The master brake cylinder as claimed in claim 1, wherein the brake force booster is configured to produce a booster force, which acts directly on the second thrust rod piston and on the first thrust rod piston only via the second thrust rod piston.

15. The master brake cylinder as claimed in claim 1, wherein the first and second thrust rod pistons are configured such that actuation of the master brake cylinder by muscle force displaces the first thrust rod piston by a greater distance than the second thrust rod piston, and actuation of the master brake cylinder via the brake force booster displaces the second thrust rod piston by a greater distance than the first thrust rod piston.

* * * * *